US008389178B2

(12) United States Patent
Nemeth et al.

(10) Patent No.: US 8,389,178 B2
(45) Date of Patent: Mar. 5, 2013

(54) ELECTROCHEMICAL ENERGY STORAGE DEVICE BASED ON CARBON DIOXIDE AS ELECTROACTIVE SPECIES

(75) Inventors: Karoly Nemeth, Darien, IL (US); Michel Antonius van Veenendaal, Naperville, IL (US); George Srajer, Oak Park, IL (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 12/879,272

(22) Filed: Sep. 10, 2010

(65) Prior Publication Data

US 2010/0330435 A1 Dec. 30, 2010

(51) Int. Cl.
*H01M 8/22* (2006.01)
(52) U.S. Cl. ......... 429/505; 429/402; 429/502; 429/517
(58) Field of Classification Search .................. 429/402, 429/502, 505, 517
See application file for complete search history.

(56) References Cited

U.S. PATENT DOCUMENTS

| 3,720,591 | A | 3/1973 | Skarlos |
| 5,213,908 | A | 5/1993 | Hagedorn |
| 5,371,171 | A | 12/1994 | Pinkus et al. |
| 6,785,123 | B2 * | 8/2004 | Keser ........................... 361/509 |
| 7,579,117 | B1 | 8/2009 | Beard |

OTHER PUBLICATIONS

Delacourt et al. "Design of an Electrochemical Cell Making Syngas (CO + H2) from CO2 and H2O Reduction at Room Temperature",Journal of the Electrochemical Society, 155, B42-B49, 2008.*
Dong Jin Ham and Jae Sung Lee Transition Metal Carbides and Nitrides as Electrode Materials for Low Temperature Fuel Cells Energies Oct. 13, 2009 873-899 2 MDPI Publishing Basel/Switzerland.
Seiji Komatsu, Michie Tanaka, Akira Okumura and Akira Kungi Preparation of Cu-solid Polymer Electrolyte Composite Electrodes and Application to Gas-phase Electrochemical Reduction of CO2 Electrochemica Acta 1995 745-753 40 Elsevier Science Ltd. Great Britain.
Rakesh K. Pandey and V. Lakshminarayanan Electro-Oxidation of Formic Acid, Methanol, and Ethanol on Electrodeposited Pd-Polyaniline Nanofiber Films in Acidic and Alkaline Medium Journal of Physical Chemistry C 2009 21596-21603 113 ACS Publications Washington D.C./U.S.
Wang X.; Hu J.-M.; Hsing I.-M. Electrochemical investigation of formic acid electro-oxidation and its crossover through a Nafion(R) membrane Journal of Electroanalytical Chemistry Jan. 15, 2004 73-80 562 Elsevier Amsterdam/Netherlands.
J. Marsen, J.T. Hinatsu, J.W. Smith, F.R. Foulkes Lectrochemical oxidation of oxalate in alkaline solutions The Canadian Journal of Chemical Engineering Apr. 1993 218-225 71.

Biljana Sljukic, Ronan Baron, Richard G. Compton Electrochemical Determination of Oxalate at Pyrolytic Graphite Electrodes Electroanalysis May 2007 918-922 19.
M. Jitaru, D. A. Lowy, M. Toma, B. C. Toma and L. Oniciu Electrochemical reduction of carbon dioxide on flat metallic cathodes Journal of Applied Electrochemistry Aug. 1997 875-889 27 Springer Netherlands.
R.P.S. Chaplin and A.A. Wragg Effects of process conditions and electrode material on reaction pathways for carbon dioxide electroreduction with particular reference to formate formation Journal of Applied Electrochemistry Dec. 2003 1107-1123 33 Springer Netherlands.
Jean-Michel Savéant Molecular Catalysis of Electrochemical Reactions. Mechanistic Aspects Chemical Reviews 2008 2348-2378 108 ACS Publications.
Eric E. Benson, Clifford P. Kubiak, Aaron J. Sathrum and Jonathan M. Smieja Electrocatalytic and homogeneous approaches to conversion of CO2 to liquid fuels Chemical Society Reviews 2009 89-99 38 RSC Publishing.
"Aaron M. Scurto, Elizabeth Newton, Ross R. Weikel, Laura Draucker, Jason Hallett,Charles L. Liotta, Walter Leitner, and Charles A. Eckert" Melting Point Depression of Ionic Liquids with CO2: Phase Equilibria Ind. Eng. Chem. Res. 2008 493-501 47.
Raja Angamuthu, Philip Byers, Martin Lutz, Anthony L. Spek, Elisabeth Bouwman Electrocatalytic CO2 Conversion to Oxalate by a Copper Complex Science Jan. 15, 2010 313-315 327.
Andrew P. Abbott and John C. Harper Electrochemical investigations in supercritical carbon dioxide J . Chem. SOC., Faraday Trans. 1996 3895-3898 92.
K.S. Lackner Capture of carbon dioxide from ambient air Eur. Phys. J. Special Topics 2009 93-106 176.
F. Ko Leli, T.Atilan, N. Palamut, A.M. Gizir, R. Aydin and C.H. Hamann Electrochemical reduction of CO2 at Pb- and Sn-electrodes in a fixed-bed reactor in aqueous K2CO3 and KHCO3 media Journal of Applied Electrochemistry 2003 447-450 33 Springer Netherlands.

(Continued)

*Primary Examiner* — Patrick Ryan
*Assistant Examiner* — Ladan Mohaddes
(74) *Attorney, Agent, or Firm* — Michael J. Dobbs; Daniel D. Park; John T. Lucas

(57) ABSTRACT

An electrochemical energy storage device comprising a primary positive electrode, a negative electrode, and one or more ionic conductors. The ionic conductors ionically connect the primary positive electrode with the negative electrode. The primary positive electrode comprises carbon dioxide ($CO_2$) and a means for electrochemically reducing the $CO_2$. This means for electrochemically reducing the $CO_2$ comprises a conductive primary current collector, contacting the $CO_2$, whereby the $CO_2$ is reduced upon the primary current collector during discharge. The primary current collector comprises a material to which $CO_2$ and the ionic conductors are essentially non-corrosive. The electrochemical energy storage device uses $CO_2$ as an electroactive species in that the $CO_2$ is electrochemically reduced during discharge to enable the release of electrical energy from the device.

23 Claims, 9 Drawing Sheets

OTHER PUBLICATIONS

P. L. Taberna, S. Mitra, P. Poizot, P. Simon and J.-M. Tarascon High rate capabilities Fe3O4-based Cu nano-architectured electrodes for lithium-ion battery applications Nature Materials Jul. 2006 567-573 5.

Kobjiro Hara and Tadayoshi Sakata Large Current Density C02 Reduction under High Pressure Using Gas Diffusion Electrodes Bull. Chern. Soc. Jpn. 1997 571-576 70.

Andrew P. Abbott and Christopher A. Eardley Electrochemical Reduction of CO2 in a Mixed Supercritical Fluid J. Phys. Chem. B 2000 775-779 104 ACS Publications.

Herausgegeben von B. P. Sullivan, K. Krist und H. E. Guard, eds. Electrochemical and Electrocatalytic Reactions of Carbon Dioxide 1993 Elsevier Amsterdam/Netherlands.

* cited by examiner

ELECTROCHEMICAL ENERGY STORAGE DEVICE BASED ON CARBON DIOXIDE AS ELECTROACTIVE SPECIES

GOVERNMENT INTERESTS

The United States Government has rights in this invention pursuant to Contract No. DE-AC02-06CH11357, between the U.S. Department of Energy (DOE) and UChicago Argonne LLC.

CROSS-REFERENCE TO RELATED APPLICATIONS

Not Applicable.

FIELD OF THE INVENTION

The present invention relates to high capacity rechargeable electrochemical energy storage devices. More specifically, the invention relates to the use of carbon dioxide as electroactive species in such devices.

BACKGROUND OF THE INVENTION

Efficient energy storage is one of the most important challenges on the way to building an economy that is less dependent on fossil fuel resources. Current implementations of electrochemical energy storage devices, such as batteries, supercapacitors, and fuel cells, use a variety of electroactive species. Common examples include lead-acid (Pb and $H_2SO_4$), nickel-cadmium (NiOOH and Cd), nickel-zinc (NiOOH and Zn), lithium-ion (various Li compounds), and nickel-metal hydride (NiOOH and various intermetallic compounds).

Metal-air batteries, and more specifically lithium-air batteries, are thought of as key enablers of electric vehicles, largely because of their very high energy densities. However, currently, metal-air batteries are unable to meet the conditions required for practical vehicle applications. Existing lithium-air battery designs are plagued with lithium oxide ($Li_2O$) and lithium peroxide ($Li_2O_2$) clogging the pores of the air-electrode, thus limiting discharging capacity. Additionally, moisture or nitrogen from the air may cause hazardous reactions. Furthermore, lithium-air batteries suffer from unproven recharge capability, limited lithium resources, and environmentally hazardous construction.

The electrolytes utilized in electrochemical energy storage devices are also significant to device performance. Typical electrolytic solutions consist of ion-forming solutes dissolved in water or organic solvents. Many of these electrolytes are toxic or flammable, further adding to the hazards of device construction, use, and disposal. U.S. Pat. No. 7,579,117 attempts to address these problems by suggesting the use of supercritical carbon dioxide ($CO_2$) as a solvent. Although successfully applying supercritical $CO_2$ as a solvent, U.S. Pat. No. 7,579,117 requires another electroactive species, stressing that the supercritical $CO_2$ is virtually inert, and does not react with other elements in the electrochemical cell.

These implementations suffer from a variety of disadvantages, including low energy density; harmful environmental impact in construction, use, and disposal; inefficiency in charging or discharging; and safety hazards during use, including risk of fire or explosion if misused or punctured.

SUMMARY OF THE INVENTION

An electrochemical energy storage device comprising a primary positive electrode, a negative electrode, and one or more ionic conductors. The ionic conductors ionically connect the primary positive electrode with the negative electrode. The primary positive electrode comprises carbon dioxide ($CO_2$) and a means for electrochemically reducing the $CO_2$. This means for electrochemically reducing the $CO_2$ comprises a conductive primary current collector, contacting the $CO_2$, whereby the $CO_2$ is reduced upon the primary current collector during discharge. The primary current collector comprises a material to which $CO_2$ and the ionic conductors are essentially non-corrosive.

The electrochemical energy storage device uses $CO_2$ as an electroactive species in that the $CO_2$ is electrochemically reduced to enable the release of electrical energy from the device. The electrochemical reduction of $CO_2$ occurs during discharge of the device.

DETAILED DESCRIPTION OF THE INVENTION

Figure 1A:
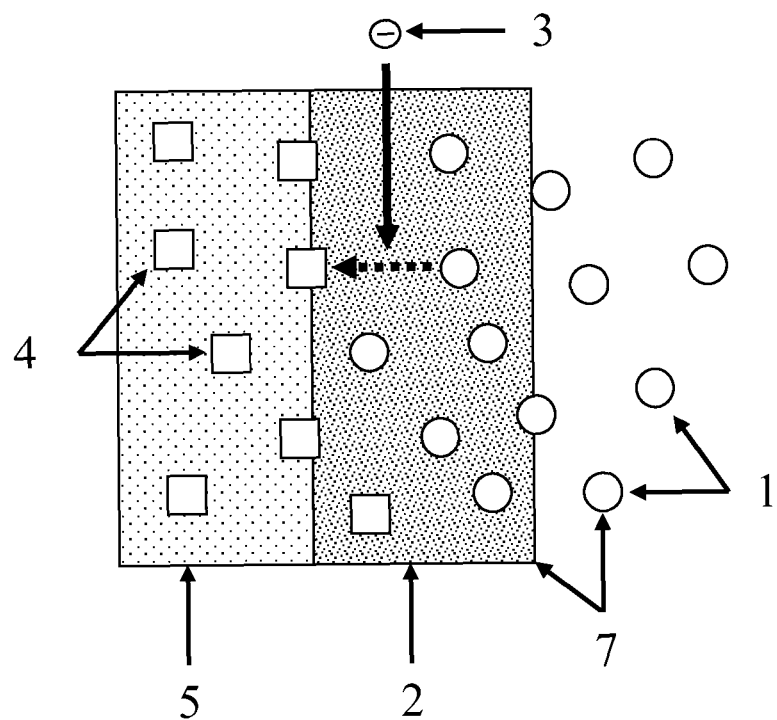
FIG. 1A and FIG. 1B depict the functioning, during discharge, of two embodiments of a primary positive electrode.

An electrochemical energy storage device comprising a primary positive electrode, a negative electrode, and one or more ionic conductors. The primary positive electrode comprises carbon dioxide ($CO_2$) and a means for electrochemically reducing the $CO_2$. This means for electrochemically reducing the $CO_2$ comprises a conductive primary current collector, contacting the $CO_2$, whereby the $CO_2$ is reduced upon the primary current collector during discharge. The primary current collector comprises a material to which $CO_2$ and the ionic conductors are essentially non-corrosive. The negative electrode comprises a material having an electrode potential more negative than the electrode potential of the primary positive electrode. The ionic conductors ionically connect the primary positive electrode with the negative electrode.

The electrochemical energy storage device uses $CO_2$ as an electroactive species in that the $CO_2$ is electrochemically reduced to enable the release of electrical energy from the device. The electrochemical reduction of $CO_2$ occurs during discharge of the device.

Primary Positive Electrode

The primary positive electrode comprises $CO_2$, as an electroactive species, and a means for electrochemically reducing the $CO_2$. This reduction means comprises a primary current collector, which contacts the $CO_2$, whereby an electrical potential may be applied through the primary current collector to the $CO_2$. The $CO_2$ may be supplied externally, or may be provided internally by inclusion within the ionic conductors.

Preferably, the partial pressure of $CO_2$ is elevated to approximately the maximum level that may be maintained without leakage or damage to the device. Higher partial pressure of $CO_2$ may be advantageous because, first, it represents a more concentrated form of $CO_2$, thus increasing the electrical capacity of the device. Second, at higher pressure, diffusion is increased, allowing for faster discharging and charging. Third, increased pressure typically helps to achieve better selectivity for oxalate and formate production when the $CO_2$ is reduced, which is favorable for rechargeability. Fourth, increased pressure typically promotes higher current efficiency. Fifth, with increasing pressure the reduction potential of $CO_2$ shifts toward substantially more positive values, even slightly above zero (with respect to the standard hydrogen electrode), resulting in increased cell voltage. In a preferred embodiment, the $CO_2$ is supercritical.

The primary current collector comprises a conductive material to which $CO_2$ and the ionic conductors are essentially non-corrosive under the temperature and pressure environment of the electrochemical energy storage device. Essentially non-corrosive means that throughout a period of several years, corrosion of the primary current collector is insufficient to substantively affect the performance of the primary current collector. The primary current collector contacts the $CO_2$, whereby electrons may be conducted through the primary current collector to the reducing $CO_2$ during discharging. The primary current collector also contacts one of the ionic conductors, whereby electrons may be conducted through the primary current collector from the oxidizing $CO_2$ reduction products during charging. Preferably, the surface area of the primary current collector is maximized to provide maximum contact with both the $CO_2$ and the ionic conductor.

If the $CO_2$ is supplied externally, then the primary current collector preferably comprises a gas-diffusion electrode, which allows the passage of $CO_2$, but prevents the passage of the ionic conductors. Such gas-diffusion electrodes preferably comprise an electrically conducting macroporous network filled with a mix of microporous conducting material. Examples include sintered conductive powders, such as copper powder or graphite powder. Additional examples include metal-solid polymer electrolyte mixtures, which comprise metal particles embedded in a matrix formed by a porous polymer, such as polytetrafluoroethylene. Preferably, gas-diffusion electrodes further comprise a catalyst.

FIG. 1A illustrates the functioning, during discharge, of the primary positive electrode 7 in one embodiment that utilizes a gas-diffusion electrode. The primary positive electrode 7 comprises the externally supplied $CO_2$ 1 and the primary current collector 2. The primary current collector 2 comprises a gas-diffusion electrode. During discharge, electrons 3 flow into the primary current collector 2 from outside the device, as illustrated by the broad solid arrow. The $CO_2$ 1 enters the device by diffusing through the primary current collector 2. The $CO_2$ 1 is exposed to the electrons 3 while diffusing through the primary current collector 2, causing the $CO_2$ 1 to electrochemically reduce to a desired reduction product 4, as illustrated by the broad dashed arrow. The reduction product 4 is then transported through the device by the ionic conductor 5. During charging, the process is reversed, with reduction product 4 within the ionic conductor 5 electrochemically oxidizing to $CO_2$ 1 within the primary current collector 2, providing a flow of electrons 3 out of the primary current collector 2. The $CO_2$ 1 then diffuses through the primary current collector 2, and escapes from the device. In a preferred embodiment, the primary current collector 2 contains catalysts promoting the electrochemical reduction of $CO_2$ 1 to the desired reduction product 4, and the electrochemical oxidation of the desired reduction product 4 to $CO_2$ 1.

If the $CO_2$ is provided internally, then the primary current collector need not allow the passage of $CO_2$. Preferably, the primary current collector in this embodiment comprises copper, tin, lead, indium, nickel, carbon, alloys thereof, or combinations thereof. The primary current collector is preferably porous, or otherwise has a structure maximizing surface area. In a preferred embodiment, the primary current collector comprises a copper plate with its surface comprising aligned nanorods, similar to the structure shown in P. L. Taberna et al., *High Rate Capabilities $Fe_3O_4$-based Cu Nano-architectured Electrodes for Lithium-ion Battery Applications*, 5 Nat. Materials 567, 568 (2006), hereby fully incorporated by reference. Copper is advantageous because it is highly conductive, mechanically stable, and inexpensive. The nanorod structure is advantageous because it provides a copper structure with a high surface area in a small volume. In another embodiment, the surface of a copper primary current collector is covered with a thin layer of one of the more expensive materials listed above. Preferably, the surface of the current collector is covered with a thin catalytic layer.

Figure 1B:
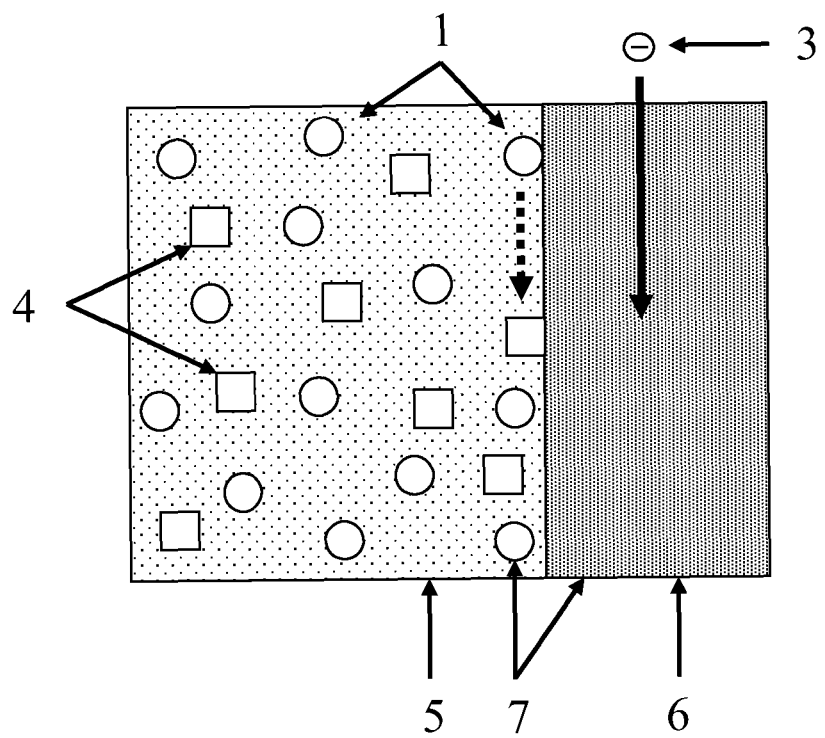

FIG. 1B illustrates the functioning, during discharge, of the primary positive electrode 7 in one embodiment that utilizes a primary current collector 6 that is not a gas-diffusion electrode. The primary positive electrode 7 comprises the internally supplied $CO_2$ 1 and the primary current collector 6. During discharge, electrons 3 flow into the primary current collector 6 from outside the device, as illustrated by the broad solid arrow. The $CO_2$ 1 is dissolved within the ionic conductor 5, and thus contacts the surface of the primary current collector 6. The $CO_2$ 1 is exposed to the electrons 3 upon the surface of the primary current collector 6, causing the $CO_2$ 1 to electrochemically reduce to a desired reduction product 4, as illustrated by the broad dashed arrow. The reduction product 4 is then transported through the device by the ionic conductor 5. During charging, the process is reversed, with the reduction product 4 within the ionic conductor 5 electrochemically oxidizing to $CO_2$ 1 upon the surface of the primary current collector 6, thus providing a flow of electrons 3 out of the primary current collector 6. The $CO_2$ 1 then dissolves within the ionic conductor 5. In a preferred embodiment, the surface of the primary current collector 6 comprises catalysts promoting the electrochemical reduction of $CO_2$ 1 to the desired reduction product 4, and the electrochemical oxidation of the desired reduction product 4 to $CO_2$ 1. Preferably, the $CO_2$ reduction product comprises oxalate, formate, or carbonate.

Negative Electrode

The negative electrode comprises a conductive material. The negative electrode has an electrode potential more negative than that of the primary positive electrode, such that an electrical conductor connecting the positive electrode to the negative electrode, without any externally applied electrical potential, would carry current in the direction from the positive electrode to the negative electrode until the device is completely discharged. In one embodiment, the negative electrode comprises a material capable of reversibly oxidizing to form a cation, which then ionically neutralizes the $CO_2$ reduction product. Preferably, the negative electrode in this embodiment comprises lithium, beryllium, aluminum, zinc, sodium, magnesium, titanium, combinations thereof, or alloys thereof. In a preferred embodiment, the negative electrode comprises lithium. Lithium is advantageous because it exhibits a very high energy density and a very negative electrode potential.

In another embodiment, the negative electrode comprises a negative current collector and an electroactive gas. The negative current collector comprises a conductive material to which the ionic conductors and the electroactive gas of the negative electrode are essentially non-corrosive under the temperature and pressure environment of the electrochemical energy storage device. The negative electrode has an electrode potential more negative than that of the primary positive electrode. Thus, during discharge, the gas electrochemically oxidizes to a cation upon the negative current collector. The cation then ionically neutralizes the $CO_2$ reduction product. In a preferred embodiment, the electroactive gas of the negative electrode comprises hydrogen. In a preferred embodiment, the negative current collector comprises a gas-diffusion electrode permeable to hydrogen.

In another embodiment, the negative electrode comprises a material to which the ionic conductors and any chemical species present therein are essentially non-corrosive. In this embodiment, a capacitive double layer forms at the surface of the negative electrode during charging. The capacitive double layer breaks down during discharge, creating an electrochemical discharge. Thus, the negative electrode exhibits an electrode potential more negative than the electrode potential of the primary positive electrode. In a preferred embodiment, the negative electrode comprises an aluminum plate with its surface comprising aligned nanorods, similar to the structure shown in P. L. Taberna et al., *High Rate Capabilities $Fe_3O_4$-based Cu Nano-architectured Electrodes for Lithium-ion Battery Applications,* 5 Nat. Materials 567, 568 (2006). Aluminum is advantageous because it is highly conductive, mechanically stable, and inexpensive. The nanorod structure is advantageous because it provides an aluminum structure with a high surface area in a small volume. The negative electrode in this preferred embodiment further comprises an oxide layer covering the surface of the negative electrode to a depth of less than about twenty-five monomolecular layers. Such an oxide layer results from exposure of the aluminum to air. This thin oxide layer is advantageous, because it helps to ensure that the negative electrode does not chemically react with the chemical species present in the ionic conductors.

One or More Ionic Conductors

The one or more ionic conductors comprise materials capable of allowing the transport of ions between the primary current collector and the negative electrode. In one embodiment, the ionic conductor comprises an electrolytic fluid contacting both the primary current collector and the negative electrode. Preferably, this electrolytic fluid comprises an ionic liquid, an organic electrolyte, or an aqueous solution. Ionic liquids are especially advantageous in embodiments utilizing a negative electrode comprising an electroactive metal, because ionic liquids provide electrodeposition of smooth, compact metal surfaces during charging. In a preferred embodiment, the ionic conductor comprises an ionic liquid with a melting point depression when exposed to the $CO_2$ in the device. Examples of such ionic liquids include tetrabutyl ammonium tetrafluoroborate ($TBABF_4$) and other ionic liquids listed in Aaron M. Scurto et al., *Melting Point Depression of Ionic Liquids with $CO_2$: Phase Equilibria,* 47 Ind. Eng. Chem. Res. 493, 497-98 (2008), hereby fully incorporated by reference. Ionic liquids that exhibit a melting point depression in the presence of pressurized $CO_2$ are advantageous for safety reasons; if the device breaks, allowing escape of the $CO_2$ from the system, the ionic liquid will quickly solidify, preventing contamination of the environment, and encasing the potentially hazardous materials composing the negative electrode. Further, ionic liquids can be solidified by cooling during device storage, to reduce self-discharge of the device. Ionic liquids exhibiting a melting point depression in the presence of pressurized $CO_2$ may alternatively be solidified simply by evacuation of the $CO_2$.

In another embodiment, the ionic conductor comprises an electrolytic solution comprising $CO_2$ as a solvent. The temperature and pressure of the $CO_2$ must be such that the $CO_2$ is in a liquid or supercritical state, so as to act as a solvent. Supercritical $CO_2$ is preferred, because increased temperature and pressure generally improve solubility and increase diffusion rates. Because $CO_2$ is itself an electrical insulator, the solution also comprises an electrolyte. The solution may also comprise a polar modifier to improve solubility of the electrolyte within the $CO_2$. If the polar modifier used is protic, such as water, for example, then the supporting electrolyte is preferably chosen to preserve the pH of the solution, typically resulting in reduction of the $CO_2$ to formates. Examples of such electrolytes include alkali carbonates or hydrocarbonates and ammonium or quaternary ammonium salts. If the polar modifier used is aprotic, such as 1,1,1,2,-tetrafluoroethane (HFC 134a), for example, then the supporting electrolyte is preferably chosen to preserve the aproticity of the solution, typically resulting in reduction of the $CO_2$ to oxalates. Such electrolytes include ionic liquids and deep eutectic solvents, and preferred examples include $TBABF_4$, and other quaternary-ammonium salts, such as oxalates, carbonates, hexafluorophosphates, tetraphenylborates, similar imidazolium salts, alkali salts of organic carbonates, and chelate complexes. Preferably, the polar modifier and the electrolyte are electroinactive within the system, or intentionally electroactive (e.g. water takes part in the formation of formates by providing protons). In this embodiment, the electrolytic solution contacts both the primary current collector and the negative electrode. Thus, the liquid or supercritical $CO_2$ of the electrolytic solution provides an abundant source of $CO_2$ for reduction at the primary current collector.

Figure 2A:
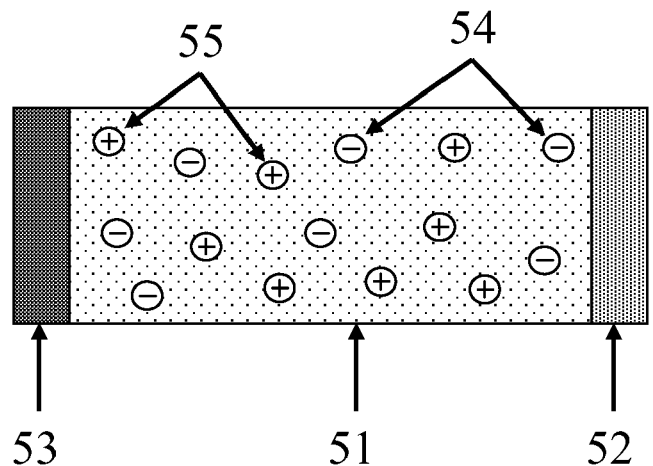
FIG. 2A, FIG. 2B, and FIG. 2C depict three embodiments of ionic conductors.

FIG. 2A depicts an embodiment in which the ionic conductor comprises one electrolyte 51 contacting both the primary current collector 52 and the negative electrode 53, as discussed above. The electrolyte 51 in this embodiment comprises the electrolytic fluid discussed above, the electrolytic solution discussed above, or a solid state electrolyte. In this embodiment, both the cation 55 and the $CO_2$ reduction product 54, which is an anion, are conducted between the primary current collector 52 and the negative electrode 53 by the electrolyte 51.

Figure 2B:
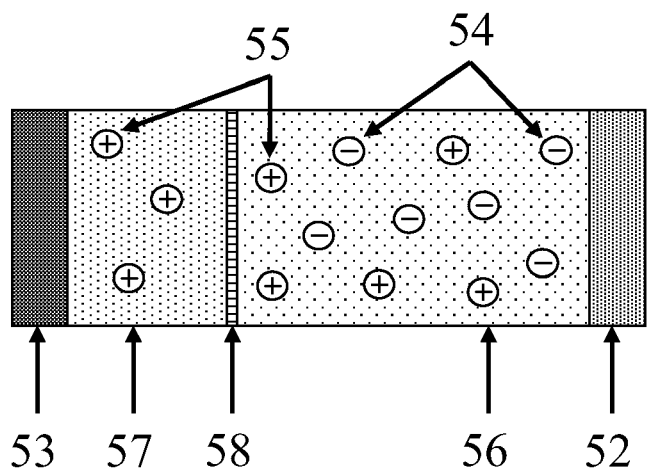

FIG. 2B depicts another embodiment, in which the ionic conductors comprise an electrolytic solution 56 comprising liquid or supercritical $CO_2$, an electrolyte, and a polar modifier, as discussed above, contacting the primary current collector 52; a second electrolyte 57 contacting the negative electrode 53; and a cation exchange membrane 58, separating the electrolytic solution 56 from the second electrolyte 57. The second electrolyte 57 preferably comprises a material that is essentially non-corrosive to the negative electrode. Preferably, the second electrolyte 57 comprises an organic electrolyte or an ionic liquid. The cation exchange membrane 58 is permeable to the cations 55 present in the system, but is not permeable to the electrolytic solution 56, the second electrolyte 57, or the $CO_2$ reduction product 54, which is an anion. Thus, cations 55 are present in both the electrolytic solution 56 and the second electrolyte 57, but the $CO_2$ reduction product 54 is confined to the electrolytic solution 56. The cation exchange membrane 58 is selected based on the specific cations 55 present in the system. Preferably, the cation exchange membrane 58 is a Nafion type membrane or a solid state composite ion-exchange electrolyte.

This embodiment reduces self-discharge where the negative electrode 53 comprises a material that is highly reactive with $CO_2$. Further, the cation 55 and $CO_2$ reduction product 54 may be more soluble in the electrolytic solution 56 than in the second electrolyte 57, resulting in less precipitation of salts from the electrolytic solution 56 than from the second electrolyte 57. Thus, this embodiment reduces clogging of the pores of the primary current collector 52 resulting from the precipitation of salts upon the primary current collector 52, when compared with an embodiment utilizing only the second electrolyte.

Figure 2C:
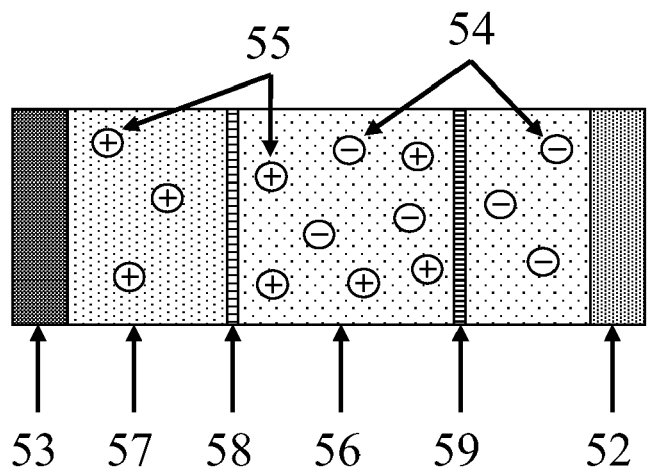

FIG. 2C depicts another embodiment, in which the ionic conductors comprise the elements of the ionic conductors depicted in FIG. 2B, and further comprise an anion exchange membrane 59, comprising a material that is permeable to the electrolytic solution 56 and the $CO_2$ reduction product 54, but is not permeable to the cations 55 in the system. Preferably, the anion exchange membrane 59 comprises a Marathon A type membrane (produced by Dow Chemicals or by Snowpure LLC), as discussed in K. S. Lackner, *Capture of carbon dioxide from ambient air,* 176 Eur. Phys. J. Special Topics 93-106 (2009), hereby fully incorporated by reference. The anion exchange membrane 59 is positioned between the cation exchange membrane 58 and the primary current collector 52. This embodiment thus has a compartment between the cation exchange membrane 58 and the anion exchange membrane 59 for the accumulation of the cation 55 and the $CO_2$ reduction product 54. This accumulation compartment results in low concentrations of those ions in the vicinity of the primary current collector and the negative electrode, thus increasing diffusion efficiency. Further, this accumulation compartment provides for convenient extraction of the ions, allowing the electrochemical energy storage device to function as a fuel cell, from which the ions are desired by-products, or as a flow battery.

Figure 3A:
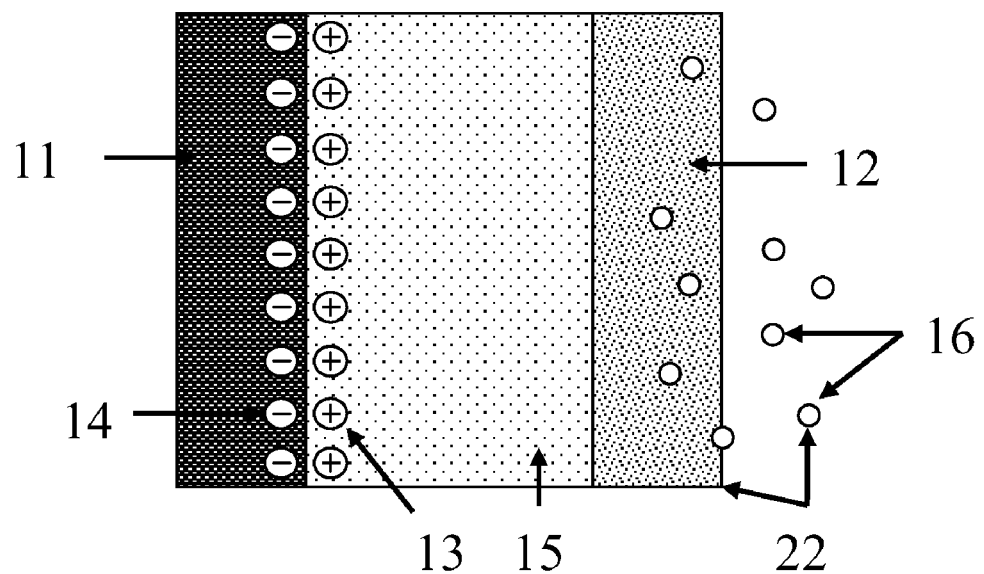
FIG. 3A and FIG. 3B each depict a schematic view of one embodiment of an electrochemical energy storage device acting as a supercapacitor.
Figure 3B:
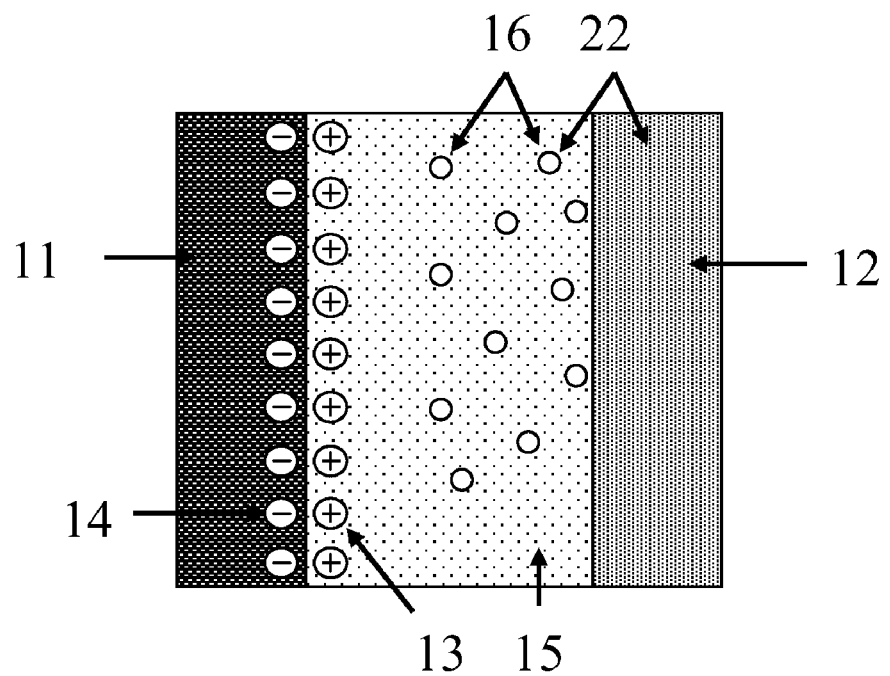

FIG. 3A and FIG. 3B

FIG. 3A and FIG. 3B each depict a schematic view of one embodiment of an electrochemical energy storage device acting as a supercapacitor. Each embodiment has essentially a non-corroding negative electrode 11, one ionic conductor comprising an electrolyte 15, and a primary positive electrode 22 comprising a primary current collector 12 and $CO_2$ 16. FIG. 3A depicts an embodiment in which the primary current collector 12 comprises a gas-diffusion electrode, as discussed above. FIG. 3B depicts an embodiment in which the primary current collector 12 does not comprise a gas-diffusion electrode, as discussed above.

The negative electrode 11 comprises an electrically conductive structure with a surface that does not essentially corrode in the presence of the electrolyte 15 or its components, or of $CO_2$. In one embodiment, the negative electrode 11 comprises the same materials and structure as the primary current collector 12. In an alternative embodiment, the negative electrode 11 comprises different materials, structure, or both than the primary current collector 12. Preferably, the negative electrode 11 is porous, or has a structure otherwise maximizing surface area. Maximizing the surface area of the negative electrode 11 is advantageous to provide maximum contact with the electrolyte 15.

The electrolyte 15 comprises a cation that does not reduce under the application of the electrical potential applied during charging, and an anion that is capable of reversibly oxidizing to carbon dioxide. Preferably, the anion is oxalate, formate, or carbonate. While the electrical potential applied during charging depends on the choice of anion, preferably the cation does not reduce under the application of a negative electrical potential with a magnitude of less than about 6 V with respect to the standard hydrogen electrode. Preferably, the cation is tetrabutyl ammonium or another quaternary ammonium or phosphonium cation.

During charging, a negative electrical potential is applied to the negative electrode 11, and a positive electrical potential is applied to the primary current collector 12. The potential difference is sufficient to cause the anion to electrochemically oxidize to $CO_2$ 16 upon the primary current collector 12, providing a flow of electrons out of the device through the primary current collector 12. In the embodiment of FIG. 3A, the $CO_2$ 16 escapes the device through the primary current collector 12, which is a gas-diffusion electrode. In the embodiment of FIG. 3B, the $CO_2$ 16 dissolves in the electrolyte 15 for use as the electroactive species of the primary positive electrode during discharge. In both embodiments, the cation does not reduce under the electrical potential applied during charging, but migrates to the surface of the negative electrode 11, creating a positive charge layer 13 upon the surface of the negative electrode 11. Because the negative electrode 11 does not react with the cation, the positive charge layer 13 induces a negative charge layer 14 within the surface of the negative electrode 11. This results in a capacitive double charge layer at the surface of the negative electrode 11 that remains after the charging electrical potential is removed from the device. Thus, the negative electrode 11 has an electrode potential more negative than the electrode potential of the primary positive electrode 22.

During discharge, the negative charge layer 14 within the negative electrode 11 provides a flow of electrons out of the device from the negative electrode 11. Electrons flowing into the device through the primary current collector 12 allow the electrochemical reduction of the $CO_2$ 16 to the anion. In the embodiment of FIG. 3A, the $CO_2$ 16 is externally supplied through the primary current collector 12, which is a gas-diffusion electrode in the embodiment depicted in FIG. 3A. In the embodiment of FIG. 3B, the $CO_2$ 16 is supplied by the $CO_2$ 16 that dissolves in the electrolyte 15 during charging. In both embodiments, the anion then ionically neutralizes the cation, eventually resulting in an electrically neutral discharged device.

Figure 4A:
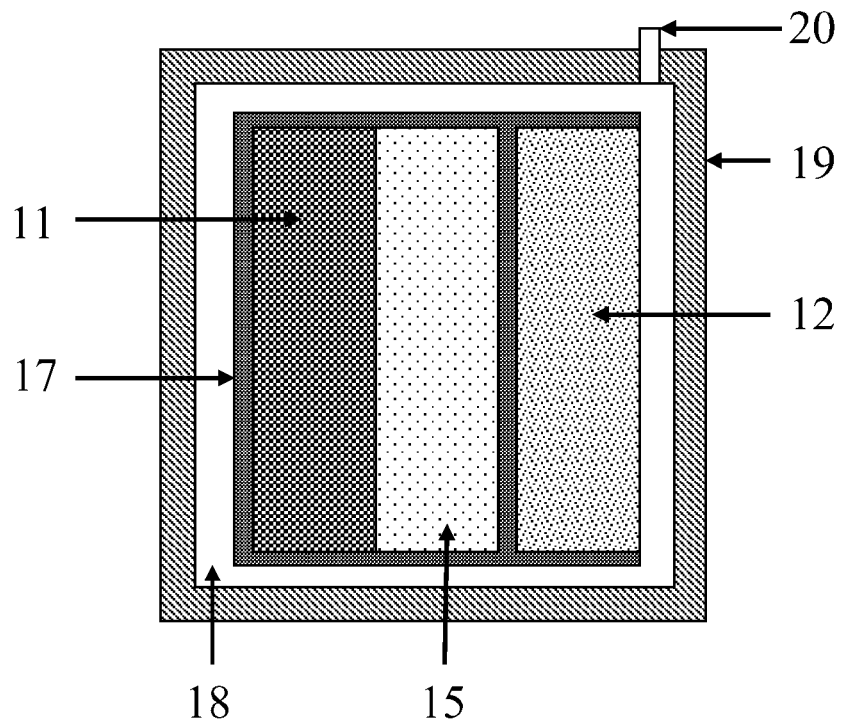
FIG. 4A depicts a cross section of a top view and FIG. 4B depicts a cross section of a side view of a preferred embodiment of an electrochemical energy storage device acting as a supercapacitor as shown in FIG. 3A and FIG. 3B.
Figure 4B:
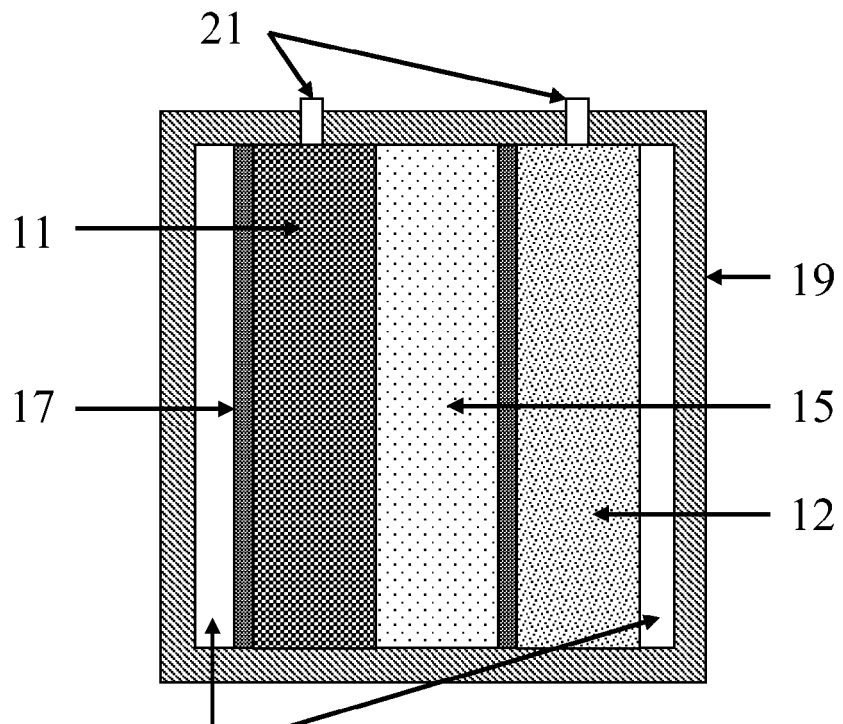

FIG. 4A and FIG. 4B

FIG. 4A depicts a cross section of a top view and FIG. 4B depicts a cross section of a side view of a preferred embodiment of an electrochemical energy storage device acting as a supercapacitor as shown in FIG. 3A and FIG. 3B. This embodiment comprises the components discussed in the description of FIG. 3A and FIG. 3B, and further comprises a selective membrane 17, pressurized $CO_2$ 18, an outer container 19, and a pressure relief valve 20.

The negative electrode 11 preferably comprises an aluminum plate with its surface comprising aligned nanorods, similar to the structure shown in P. L. Taberna et al., *High Rate Capabilities $Fe_3O_4$-based Cu Nano-architectured Electrodes for Lithium-ion Battery Applications*, 5 Nat. Materials 567, 568 (2006), and an insulating oxide ($Al_2O_3$) layer covering the surface of the aluminum to a depth of less than about twenty-five monomolecular layers, as discussed above.

The primary current collector 12 comprises a gas-diffusion electrode containing a catalyst favorable for electrochemically reducing $CO_2$ to a desired reduction product, and a catalyst favorable for electrochemically oxidizing that reduction product to $CO_2$. Preferably, the $CO_2$ reduction product comprises oxalate. Preferably, the catalysts favorable for electrochemically reducing $CO_2$ to oxalate comprise transition metals, transition metal nitrides, transition metal carbides, and organometallic compounds. Examples of such catalysts are discussed in M. Jitaru et al., *Electrochemical Reduction of Carbon Dioxide on Flat Metallic Cathodes*, 27 J. Applied Electrochemistry 875-889 (1997); R. P. S. Chaplin and A. A. Wragg, *Effects of Process Conditions and Electrode Material on Reaction Pathways for Carbon Dioxide Electroreduction with Particular Reference to Formate Formation*, 33 J. Applied Electrochemistry 1107-1123 (2003); Jean-Michel Savéant, *Molecular Catalysis of Electrochemical Reactions. Mechanistic Aspects*, 108 Chem. Revs. 2348-2378 (2008); Eric E. Benson et al., *Electrocatalytic and Homogeneous Approaches to Conversion of CO2 to Liquid Fuels*, 38 Chem. Socy. Revs. 89-99 (2009); Dong-Jim Ham et al., *Transition Metal Carbides and Nitrides as Electrode Materials for Low Temperature Fuel Cells*, 2 Energies 873-899 (2009); Raja Angamuthu et al., *Electrocatalytic $CO_2$ Conversion to Oxalate by a Copper Complex*, 327 Science 313-315 (2010), each hereby fully incorporated by reference. Preferably, the catalysts favorable for electrochemically oxidizing oxalate to $CO_2$ comprise transition metals, transition metal carbides, transition metal nitrides, and transition metal oxides. Examples of such catalysts are discussed in Rakesh K. Pandey and V. Lakshminarayanan, *Electro-Oxidation of Formic Acid, Methanol, and Ethanol on Electrodeposited Pd-Polyaniline Nanofiber Films in Acidic and Alkaline Medium*, 113 J. Physical Chem. C 21596-21603 (2009); Wang X. et al., *Electrochemical Investigation of Formic Acid Electro-oxidation and its Crossover Through a Nafion(R) Membrane*, 562 J. Electroanalytical Chem. 73-80 (2004); J. Marsen et al., *Electrochemical Oxidation of Oxalate in Alkaline Solutions*, 71 Can. J. Chem. Engr. 218-225 (1993); Biljana Sljukic et al., *Electrochemical Determination of Oxalate at Pyrolytic Graphite Electrodes*, 19 Electroanalysis 918-922 (2007), each hereby fully incorporated by reference. In a preferred embodiment, the oxidizing catalyst comprises $PbO_2$ and a precious metal.

The electrolyte 15 comprises an ionic liquid comprising the cation and anion discussed in the description of FIG. 3A. Ionic liquids are advantageous for the reasons discussed above. Preferably, the ionic liquid comprises bis tetrabutylammonium oxalate ($[N(C_4H_9)_4]_2C_2O_4$).

The outer container 19 contains the pressurized $CO_2$ 18, and comprises a material to which the pressurized $CO_2$ 18 is essentially non-corrosive, and that is capable of containing the pressurized $CO_2$ 18 without leakage. In one embodiment, the outer container 19 comprises steel.

The selective membrane 17 is permeable to the pressurized $CO_2$ 18 and to the anion, but is not permeable to the remainder of the electrolyte 15. The selective membrane 17 contacts and encases the negative electrode 11 and the electrolyte 15, thus separating them from the primary current collector 12. This separation prevents the pores of the primary current collector from being clogged by the ionic liquid.

The pressurized $CO_2$ 18, located primarily within the channel between the outer container 19 and the selective membrane 17, serves as a reservoir for $CO_2$. This is provided to be electrochemically reduced during discharge, in case some of the anion electrochemically oxidizes to carbon monoxide (CO) or oxygen ($O_2$), rather than $CO_2$, during charging. Further, if the electrolyte 15 comprises an ionic liquid that exhibits a melting point depression when exposed to pressurized $CO_2$, then the pressurized $CO_2$ 18 also prevents the electrolyte 15 from solidifying as the cation and anion form a salt during discharge.

The pressure relief valve 20 is a safety feature to prevent damage in case of uncontrolled elevated pressure. The pressure relief valve 20 comprises a valve that opens automatically or manually, allowing discharge of the pressurized $CO_2$ 18 if the $CO_2$ pressure exceeds a pressure that can be safely contained by the outer container 19. Such a pressure relief valve 20 is preferably included in any embodiment utilizing pressurized media. However, this feature is omitted for clarity from the illustrations and discussions of the remaining embodiments.

The means 21 for electrically contacting the negative electrode 11 and the primary current collector 12 from the outside of the outer container 19 comprises a conductive material to which the pressurized $CO_2$ 18 is essentially non-corrosive. Preferably, this electrical contact means 21 comprises electrically insulated wires or metal terminals.

FIG. 5

Figure 5:
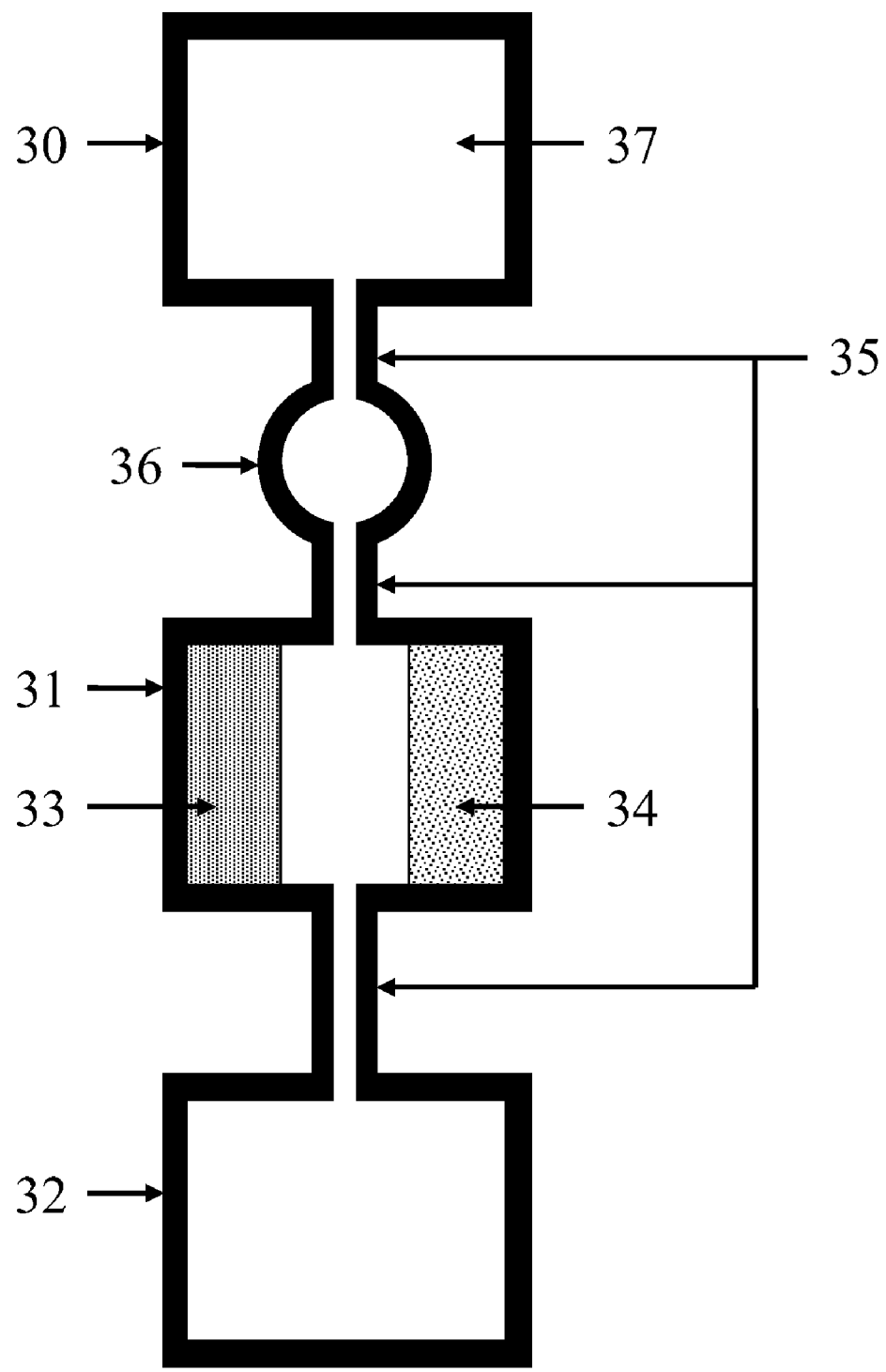
FIG. 5 depicts a cross section of a schematic view of one embodiment of an electrochemical energy storage device acting as a flow battery.

FIG. 5 depicts a schematic view of one embodiment of an electrochemical energy storage device acting as a flow battery. This embodiment comprises a source container 30; a reaction container 31; a product container 32; a negative electrode 33; a primary current collector 34 and $CO_2$ (not depicted), which together compose the primary positive electrode; an electrolytic fluid 37 composing the ionic conductor; and means for reversibly transporting the electrolytic fluid 37 from the source container 30, through the reaction container 31, into the product container 32.

The $CO_2$ may be provided internally by inclusion within the electrolytic fluid 37, or provided from an external source. The primary current collector 34 preferably comprises a gas-diffusion electrode or porous material, as discussed above, such that the $CO_2$ electrochemically reduces to a desired reduction product upon the primary current collector 34 during discharge. Preferably, the $CO_2$ reduction product is oxalate, carbonate, or formate. The negative electrode 33 comprises a material capable of reversibly electrochemically oxidizing to a cation, which ionically neutralizes the $CO_2$ reduction product. Preferably, the negative electrode 33 comprises lithium, beryllium, aluminum, zinc, sodium, magnesium, titanium, combinations thereof, or alloys thereof, or hydrogen. The negative electrode 33 and the primary current collector 34 are located at least partially within the reaction container 31.

During discharge, the electrolytic fluid 37 is transported from the source container 30, through the reaction container 31, to the product container 32. The anionic $CO_2$ reduction product formed upon the primary current collector 34 neutralizes the cations formed by the electrochemical oxidation of the negative electrode 33, and the cations and the $CO_2$ reduction product dissolve within the electrolytic fluid 37 within the reaction container 31. These ions are thus transported with the electrolytic fluid 37 from the reaction container 31 to the product container 32, where it is stored. During charging, the flow of the electrolytic fluid 37 is reversed, a positive electrical potential is applied to the primary current collector 34, and a negative electrical potential is applied to the negative electrode 33. The potential difference is sufficient to cause the $CO_2$ reduction product to electrochemically oxidize back to $CO_2$ upon the primary current collector 34, and to cause the cation to reduce back to the material composing the negative electrode 33. If the material composing the negative electrode 33 is a metal, then the metal is electrodeposited upon the negative electrode 33 as the cation is reduced.

FIG. 5 depicts the means for transporting the electrolytic fluid 37 as tubes 35 connected to a pump 36 and to the three containers in series. This is by way of illustration, and not by way of limitation. The means for transporting the electrolytic fluid 37 may comprise any form of fluid transport, including, for example, pumping, propelling, gravitational flow, and convection currents. Alternatively, the electrolytic fluid 37 may be transported through a closed circuit, in which the $CO_2$ reduction product and the cations produced within the reaction container 31 are allowed to precipitate out of the electrolytic fluid 37 as a salt within the product container 32, where the salt is stored, while the electrolytic fluid 37 is transported directly back to the source container 30.

FIG. 6

Figure 6:
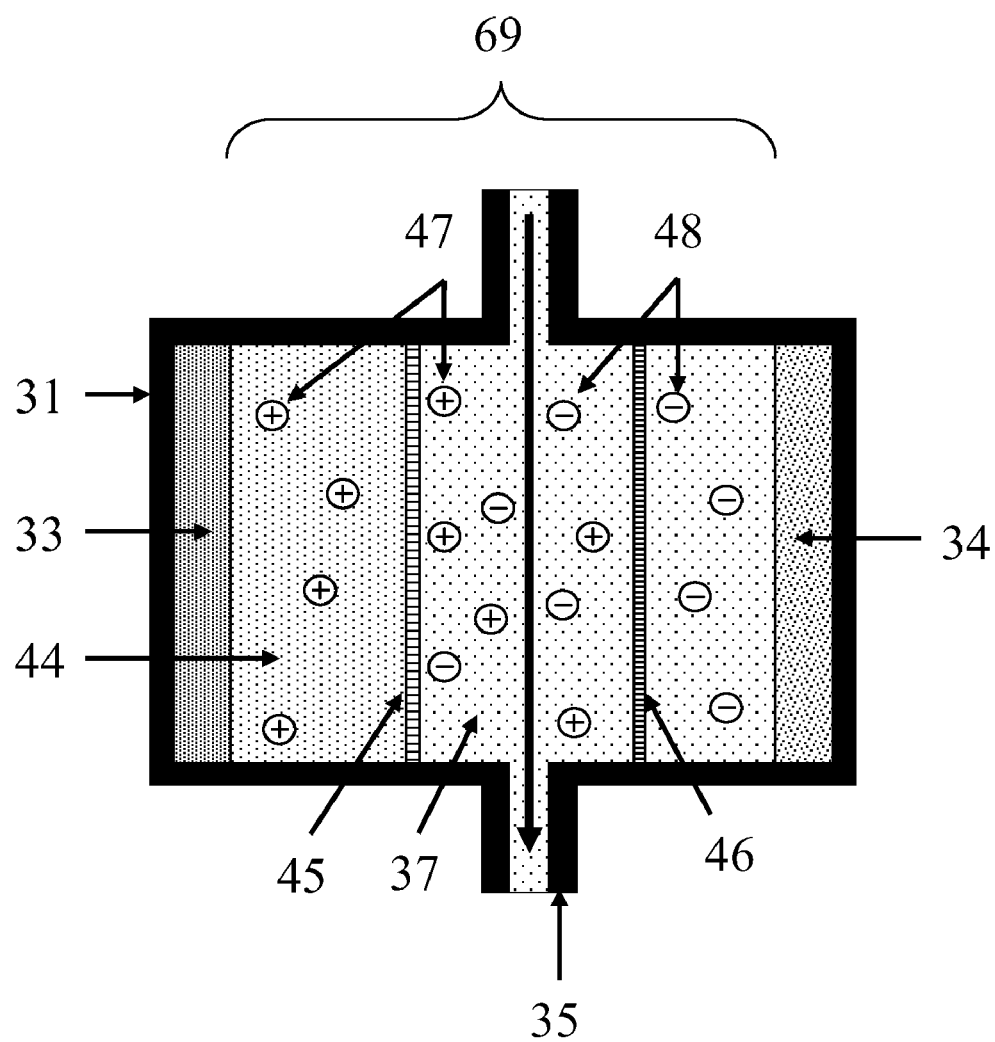
FIG. 6 depicts a cross section of one embodiment of the reaction container of an electrochemical energy storage device acting as a flow battery as shown in FIG. 5.

FIG. 6 depicts a cross section of one embodiment of the reaction container 31 of an electrochemical energy storage device acting as a flow battery as shown in FIG. 5. This embodiment comprises a reaction container 31; a negative electrode 33; a primary current collector 34; and ionic conductors 69 comprising an electrolytic fluid 37, a second electrolyte 44, a cation exchange membrane 45, and an anion exchange membrane 46.

The reaction container 31 comprises a material to which the electrolytic fluid 37 and the second electrolyte 44 are essentially non-corrosive. Preferably, the reaction container 31 comprises steel.

The electrolytic fluid 37 comprises liquid or supercritical $CO_2$, an electrolyte, and a polar modifier, as discussed above. The electrolytic fluid 37 contacts the primary current collector 34. The liquid or supercritical $CO_2$ of the electrolytic fluid 37 provides an abundant source of $CO_2$ for reduction at the primary current collector 34. The second electrolyte 44 preferably comprises a material that is essentially non-corrosive to the negative electrode. Preferably, the second electrolyte 44 comprises an organic electrolyte or an ionic liquid. The second electrolyte 44 contacts the negative electrode 33.

The primary current collector 34 comprises a material to which the electrolytic fluid is essentially non-corrosive. Preferably, the primary current collector 34 comprises a copper plate with its surface comprising aligned nanorods, as discussed above.

The cation exchange membrane 45 is permeable to cations 47 present in the system, but is not permeable to the second electrolyte 44, the electrolytic fluid 37, or the $CO_2$ reduction product 48, as discussed above. The cation exchange membrane 45 separates the second electrolyte 44 from the electrolytic fluid 37. Thus, cations 47 are present in both the electrolytic fluid 37 and the second electrolyte 44, but the $CO_2$ reduction product 48 is confined to the electrolytic fluid 37.

The anion exchange membrane 46 is permeable to the electrolytic fluid 37 and the $CO_2$ reduction product 48, but is not permeable to the cations 47 in the system, as discussed above. The anion exchange membrane 46 is positioned between the cation exchange membrane 45 and the primary current collector 34. This embodiment thus has a compartment between the cation exchange membrane 45 and the anion exchange membrane 46 for the accumulation of the cation 47 and the $CO_2$ reduction product 48. This accumulation compartment results in low concentrations of the ions in the vicinity of the primary current collector and the negative electrode, thus increasing diffusion efficiency.

In this embodiment, the means for reversibly transporting the electrolytic fluid from the source container (not shown) through the reaction container 31, to the product container (not shown) comprises a reversible pump (not shown) and tubes 35, entering each container at one or more points. The pump preferably comprises a direct lift, displacement, velocity, buoyancy, or gravity pump. In this embodiment, one or more tubes 35 enter the reaction container 31 within the accumulation compartment, leading from the source container, and one or more tubes 35 enter the reaction container 31 on the opposite end of the accumulation compartment, leading to the product container. The broad arrow indicates flow of the electrolytic fluid 37 through the tubes 35 and reaction container 31 during discharge.

FIG. 7

Figure 7:
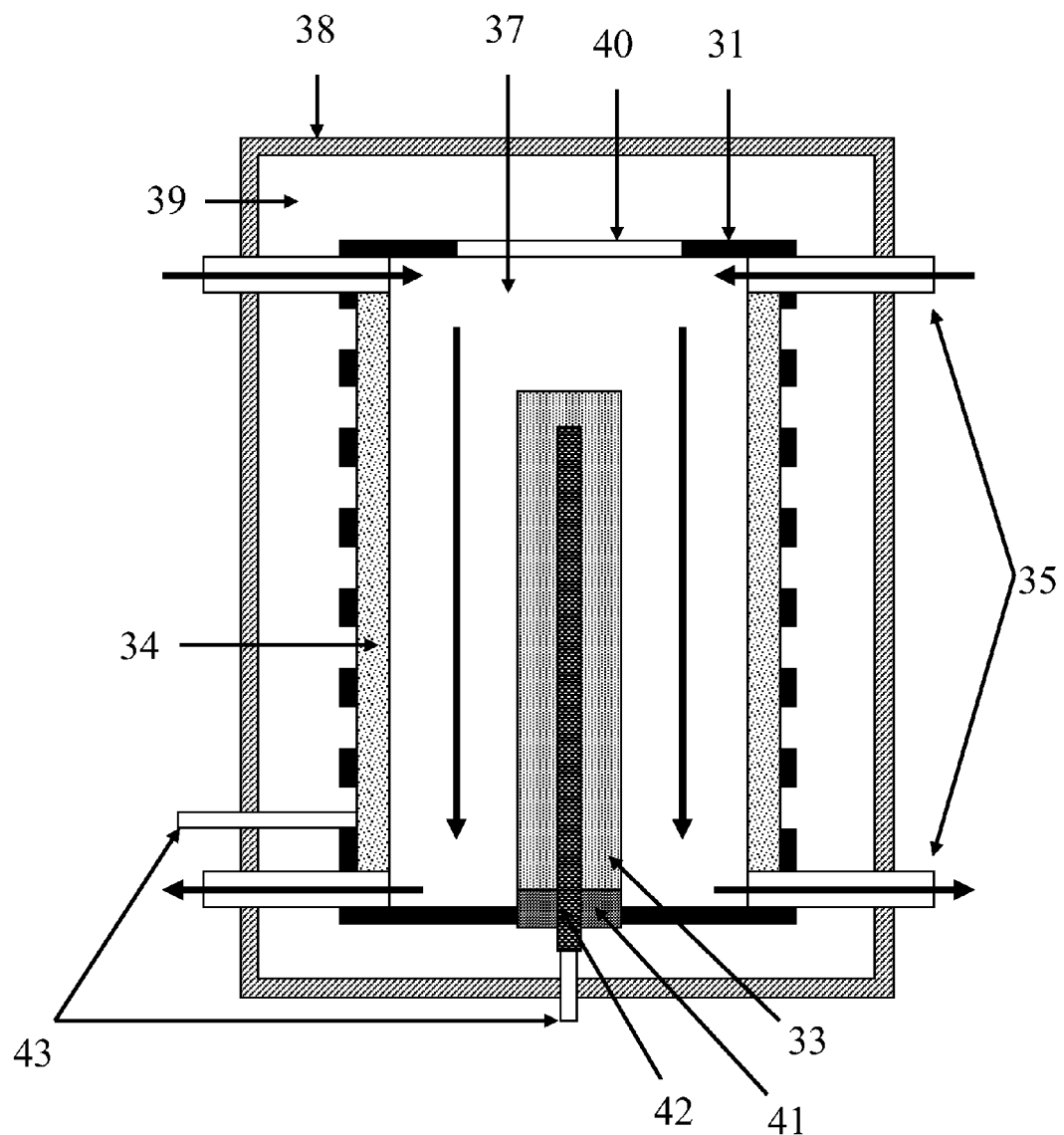
FIG. 7 depicts a cross section of a preferred embodiment of the reaction container of an electrochemical energy storage device acting as a flow battery as shown in FIG. 5, using a solid negative electrode.

FIG. 7 depicts a cross section of a preferred embodiment of the reaction container of an electrochemical energy storage device acting as a flow battery as shown in FIG. 5. This embodiment comprises a reaction container 31, a negative electrode 33, a primary current collector 34, an electrolytic fluid 37, an outer container 38, pressurized $CO_2$ 39, and means 43 for electrically contacting the negative electrode 33 and the primary current collector 34 from the outside of the outer container 38.

The electrolytic fluid 37 comprises an ionic liquid. Ionic liquids are advantageous for the reasons discussed above. Preferably, the electrolytic fluid 37 comprises an ionic liquid that exhibits a melting point depression in the presence of the pressurized $CO_2$ 39.

The outer container 38 comprises a container capable of containing the pressurized $CO_2$ 39. The pressurized $CO_2$ 39 fills the outer container 38. The pressure and temperature of the $CO_2$ are determined based on the ionic liquid selected to compose the electrolytic fluid 37. The pressure and temperature of the $CO_2$ are sufficient to maintain the ionic liquid in a liquid state. For example, if the ionic liquid used is tetrabutylammonium trifluorotris(perfluoroethyl)phosphate ([TBAm][$TFEPF_3$]), and the $CO_2$ pressure is 34.8 bar, then the temperature is at least 17.3° C., to keep the ionic liquid in a liquid state. The pressure and temperature necessary for several other exemplary ionic liquids are discussed in Aaron M. Scurto et al., *Melting Point Depression of Ionic Liquids with CO2: Phase Equilibria,* 47 Ind. Eng. Chem. Res. 493, 497-98 (2008).

The reaction container 31 is located within the outer container 38, such that the reaction container 31 is immersed in the high pressure $CO_2$ 39. The reaction container 31 comprises a material to which the electrolytic fluid 37 and the pressurized $CO_2$ 39 are essentially non-corrosive. Preferably, the reaction container 31 comprises steel. FIG. 7 depicts the reaction container 31 as cylindrical, but the reaction container 31 may be of any shape. It has holes in at least one side, sufficiently large to allow the passage of the pressurized $CO_2$ 39. The reaction container 31 further comprises a $CO_2$ exchange membrane 40 and an electrically insulating seal 41, each sealing one portion of the reaction container 31. FIG. 7 depicts the $CO_2$ exchange membrane 40 and the electrically insulating seal 41 as sealing opposite ends of the cylindrical reaction container 31. The $CO_2$ exchange membrane 40 allows $CO_2$ to escape from the reaction container 31 during charging, and further allows the equilibration of pressure between the reaction container 31 and the outer container 38.

The primary current collector 34 comprises a gas-diffusion electrode containing a catalyst favorable for electrochemically reducing $CO_2$ to a desired reduction product, and a catalyst favorable for electrochemically oxidizing that reduction product to $CO_2$, as discussed above. Preferably, the $CO_2$ reduction product comprises oxalate. The primary current collector 34 is permeable to the high pressure $CO_2$ 39, but not to the electrolytic fluid 37. The primary current collector 34 separates the electrolytic fluid 37 from the holes in the reaction container 31, such that the electrolytic liquid 37 may not escape the reaction container 31 through the holes. FIG. 7 depicts the primary current collector 34 as lining the curved wall of the cylindrical reaction container 31.

The negative electrode 33 comprises an electroactive material, as discussed in the description of FIG. 5. The negative electrode 33 further comprises a negative current collector 42 comprising a conductive material to which the electrolytic fluid 37 and the pressurized $CO_2$ 39 are essentially non-corrosive. Preferably, the negative current collector 42 comprises a copper rod or plate. The negative current collector 42 extends through the electrically insulating seal 41, such that the negative current collector 42 extends both inside and outside the reaction container 31, but does not electrically contact the reaction container 31. The electroactive material of the negative electrode 33 encases the portion of the negative current collector 42 that extends within the reaction container 31.

In this embodiment, the means for reversibly transporting the electrolytic fluid from the source container (not shown) through the reaction container 31, to the product container (not shown) comprises a reversible pump (not shown) and tubes 35, entering each container at one or more points. In this preferred embodiment, one or more tubes 35 enter the reaction container 31 near its top, leading from the source container, and one or more tubes 35 enter the reaction container 31 near its bottom, leading to the product container. The broad arrows indicate the flow of the electrolytic fluid 37 through the tubes 35 and reaction container 31 during discharge.

The means 43 for electrically contacting the negative electrode 33 and the primary current collector 34 from the outside of the outer container 38 comprises an electrically conductive material to which the pressurized $CO_2$ 39 is essentially non-corrosive. Preferably, this electrical contact means 43 comprises electrically insulated wires or metal terminals.

FIG. 8

Figure 8:
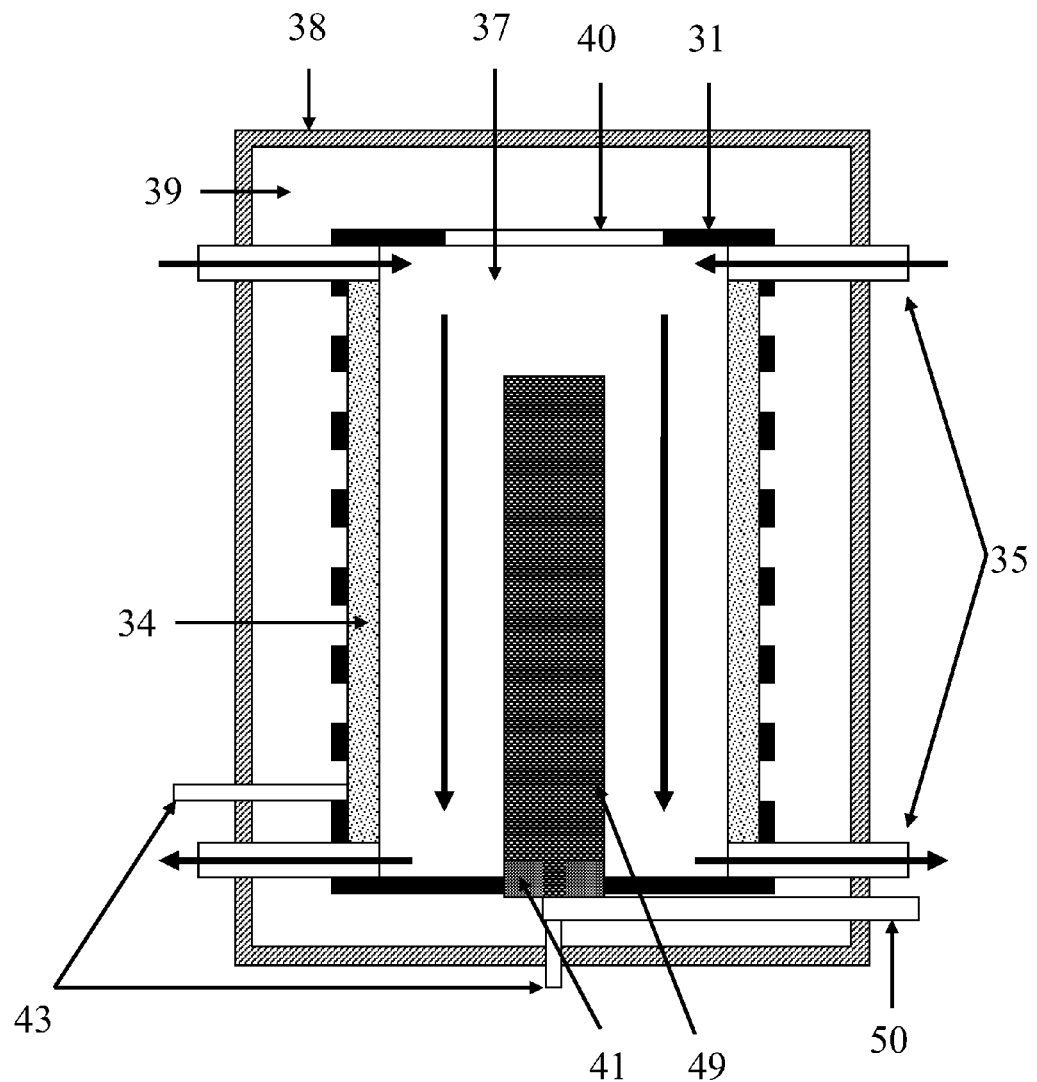
FIG. 8 depicts a cross section of a preferred embodiment of the reaction container of an electrochemical energy storage device acting as a flow battery as shown in FIG. 5, using a gaseous negative electrode.

FIG. 8 depicts a cross section of a preferred embodiment of the reaction container of an electrochemical energy storage device acting as a flow battery as shown in FIG. 5. This embodiment is similar to that depicted in FIG. 7, except that the negative electrode comprises an electroactive gas, a current collector comprising a gas-diffusion electrode 49, and a means 50 for delivering the gas to the gas-diffusion electrode 49.

The electroactive gas is capable of reversibly oxidizing to form a cation, which then ionically neutralizes the $CO_2$ reduction product. In this preferred embodiment, the electroactive gas comprises hydrogen.

The gas-diffusion electrode 49 is permeable to hydrogen, but is not permeable to the electrolytic fluid 37. The gas-diffusion electrode 49 comprises a material to which the hydrogen, the protons formed by the oxidation of the hydrogen, the electrolytic fluid 37, $CO_2$, and the $CO_2$ reduction product present in the system are essentially non-corrosive. The structure of the gas-diffusion electrode 49 is like that of the $CO_2$ gas-diffusion electrodes discussed above. The gas-diffusion electrode 49 further comprises a catalyst favorable for oxidizing hydrogen to protons, and a catalyst favorable for reducing protons to hydrogen. Preferably, the catalysts comprise noble metals, transition metal carbides, and transition metal nitrides.

In this embodiment, the means 50 for delivering the hydrogen to the gas-diffusion electrode 49 comprises a tube allowing a flow of hydrogen to the gas-diffusion electrode 49 from a source (not shown) outside the outer container 38.

Figure 9A:
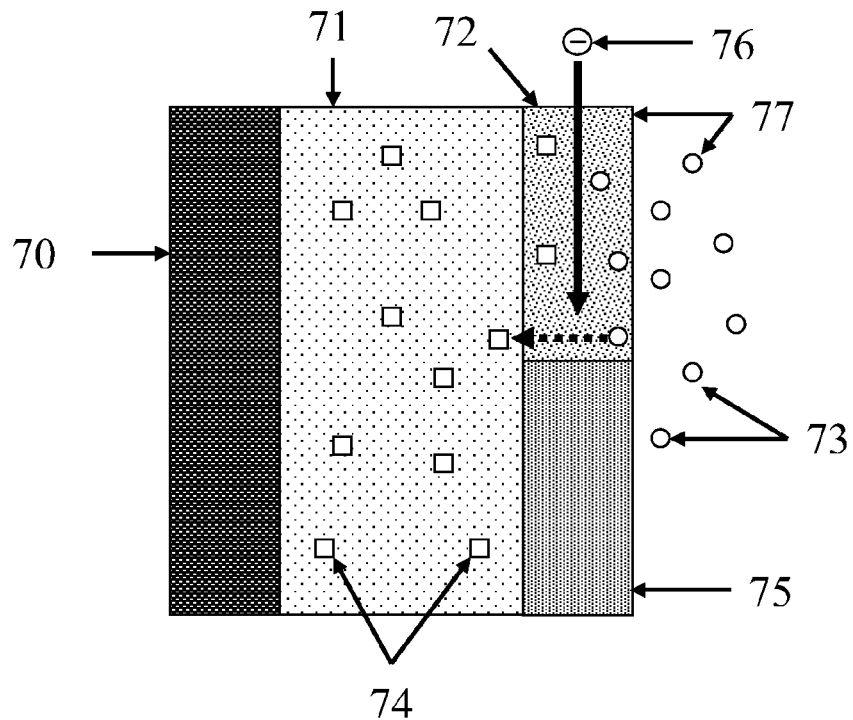
FIG. 9A and FIG. 9B depict schematics of one embodiment of an electrochemical energy storage device having a charging positive electrode.
Figure 9B:
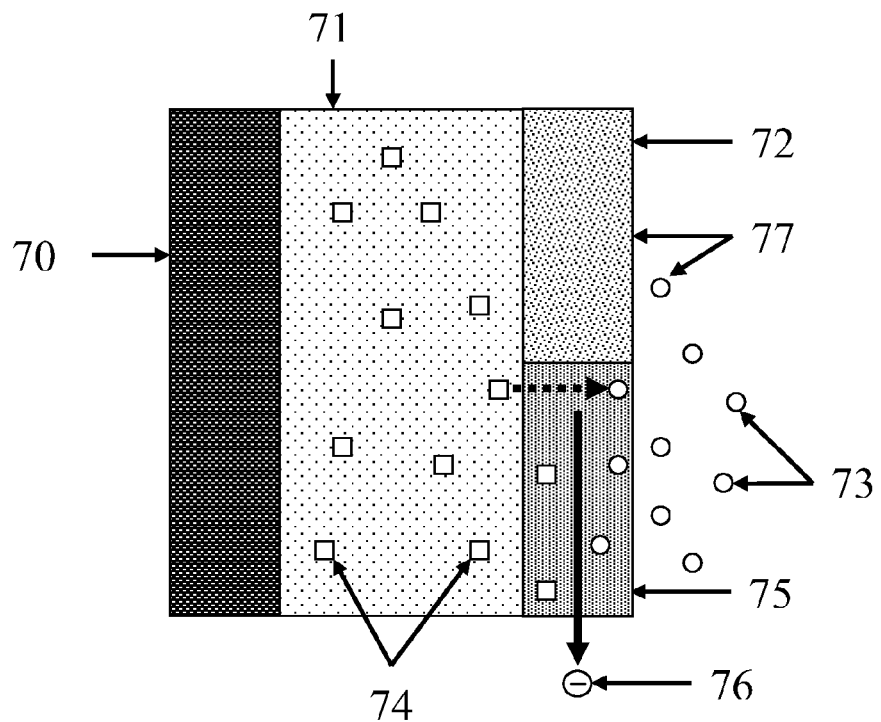

FIG. 9A and FIG. 9B

FIG. 9A and FIG. 9B depict schematics of one embodiment of an electrochemical energy storage device having a negative electrode 70, one or more ionic conductors 71, a primary positive electrode 77, and a charging positive electrode.

The primary positive electrode 77 comprises a primary current collector 72, $CO_2$ 73, and a reducing catalyst (not depicted). The primary current collector 72 preferably comprises a gas-diffusion electrode or porous material, as discussed above, such that the $CO_2$ 73 electrochemically reduces to a desired reduction product 74 upon the primary current collector 72 during discharge. The reducing catalyst is favorable for reducing $CO_2$ 73 to the desired reduction product 74. The reducing catalyst at least partially covers the surface of the primary current collector 72.

The charging positive electrode comprises a charging current collector 75 and an oxidizing catalyst (not depicted). The charging current collector 75 preferably comprises a gas-diffusion electrode or porous material, having the same characteristics as the primary current collector 72, such that the $CO_2$ reduction product 74 oxidizes to $CO_2$ 73 upon the charging current collector 75 during charging. The oxidizing catalyst is favorable for oxidizing the $CO_2$ reduction product 74 to $CO_2$ 73. The oxidizing catalyst at least partially covers the surface of the charging current collector 75.

FIG. 9A illustrates the functioning of the primary positive electrode. During discharge, an electrically resistive load is applied between the primary current collector 72 and the negative electrode 70, causing electrons 76 to flow into the primary current collector 72 from outside the device, as illustrated by the broad solid arrow. The $CO_2$ 73 is exposed to the electrons 76 while passing across the surface of the primary current collector 72, causing the $CO_2$ 73 to electrochemically reduce to a desired reduction product 74, as illustrated by the broad dashed arrow. The reducing catalyst, present on the surface of the primary current collector 72, facilitates this electrochemical reduction. The reduction product 74 is then transported through the device by the ionic conductors 71.

FIG. 9B illustrates the functioning of the charging positive electrode. During charging, a positive electrical potential is applied to the charging current collector 75, causing electrons 76 to flow out of the charging current collector 75, as illustrated by the broad solid arrow. The reduction product 74 within the ionic conductors 71 yields electrons 76 while passing across the surface of the charging current collector 75, causing the reduction product 74 to electrochemically oxidize to $CO_2$ 73, as illustrated by the broad dashed arrow. The oxidizing catalyst, present on the surface of the charging current collector 75, facilitates this electrochemical oxidation.

This embodiment allows the charging positive electrode to comprise materials maximizing selectivity and efficiency in oxidizing a desired $CO_2$ reduction product, while the primary positive electrode comprises different materials maximizing selectivity and efficiency in reducing $CO_2$ to the desired reduction product. This increases the energy storage efficiency of the device. The addition of a charging positive electrode, as defined above, may be applied to any of the foregoing embodiments, or any other embodiments, of the electrochemical energy storage device described herein.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C.§112, ¶ 6. In particular, the use of "step of" in the claims herein is not intended to invoke the provisions of 35 U.S.C.§112, ¶ 6.

The invention claimed is:

1. An electrochemical energy storage device comprising:
   a. a primary positive electrode, comprising:
      i. carbon dioxide;
      ii. means for electrochemically reducing said carbon dioxide;
      iii. said electrochemical reduction means comprising a conductive primary current collector, contacting said carbon dioxide, whereby said carbon dioxide is the primary electroactive species reduced upon said primary current collector during the discharge cycle of said electrochemical energy storage device; and
      iv. said primary current collector comprising a material to which said carbon dioxide is essentially non-corrosive;
   b. a negative electrode comprising a material with an electrode potential more negative than the electrode potential of said primary positive electrode; and
   c. one or more ionic conductors, ionically connecting said primary positive electrode with said negative electrode.

2. The electrochemical energy storage device of claim 1, wherein said ionic conductor comprises an electrolytic solution comprising:
   a. a solvent comprising carbon dioxide;
   b. an electrolyte;
   c. a polar modifier, comprising a material capable of increasing the solubility of said electrolyte in said carbon dioxide; and
   d. said carbon dioxide is of temperature and pressure allowing dissolution of said polar modifier and said supporting electrolyte.

3. The electrochemical energy storage device of claim 2, wherein said carbon dioxide is supercritical.

4. The electrochemical energy storage device of claim 1, wherein:
   a. said ionic conductors comprise an electrolyte comprising:
      i. a cation that does not reduce under the application of an electrical potential of less than about 6 V;
      ii. an anion that is capable of reversibly oxidizing to carbon dioxide; and
      iii. said electrolyte contacts said negative electrode; and
   b. said negative electrode comprises a conductive material to which said carbon dioxide and said ionic conductors are essentially non-corrosive.

5. The electrochemical energy storage device of claim 4, further comprising:
   a. an outer container surrounding said primary positive electrode, said negative electrode and said ionic conductors;
   b. means for electrically contacting said negative current collector and said primary current collector from the outside of said outer container;
   c. pressurized carbon dioxide filling said outer container;
   d. said ionic conductors further comprise:
      i. a selective membrane passable to said pressurized carbon dioxide and to carbon dioxide reduction products, but not passable to said electrolyte; and
      ii. said selective membrane contacts and encases said negative electrode and said electrolyte, separating said negative electrode and said electrolyte from said primary current collector;
   e. said primary current collector comprises:
      i. a gas-diffusion electrode permeable to carbon dioxide;
      ii. a reducing catalyst favorable for reduction of carbon dioxide to a desired reduction product;
      iii. an oxidizing catalyst favorable for oxidation of the desired reduction product to carbon dioxide; and
      iv. said reducing catalyst and said oxidizing catalyst are contained within said gas-diffusion electrode;
   f. said primary current collector contacts at least part of said selective membrane; and
   g. said primary current collector also contacts said pressurized carbon dioxide, whereby said carbon dioxide may diffuse through said gas-diffusion electrode to said selective membrane.

6. The electrochemical energy storage device of claim 5, wherein:
   a. said electrolyte comprises bis tetrabutyl-ammonium oxalate ($[N(C_4H_9)_4]_2C_2O_4$);
   b. said conductive material of said negative electrode comprises porous aluminum with its surface oxidized to a depth of less than about twenty-five monomolecular layers;
   c. said reducing catalyst is favorable for reducing said carbon dioxide to oxalate; and
   d. said oxidizing catalyst is favorable for oxidizing oxalate to said carbon dioxide.

7. The electrochemical energy storage device of claim 1, further comprising:
   a. a source container;
   b. a reaction container;
   c. a product container;
   d. said one or more ionic conductors comprise an electrolytic fluid;
   e. means for reversibly transporting said electrolytic fluid from said source container, through said reaction container, into said product container; and
   f. said positive electrode and said negative electrode are located at least partially within said reaction container.

8. The electrochemical energy storage device of claim 7, wherein said one or more ionic conductors further comprise:
   a. a first electrolytic solution that is essentially non-corrosive to said negative electrode, which first electrolytic solution is in contact with said negative electrode;

b. a cation exchange membrane separating said first electrolytic solution from said electrolytic fluid;
c. an anion exchange membrane passable to said electrolytic fluid;
d. said anion exchange membrane is located between said cation exchange membrane and said primary current collector, thereby creating a compartment between said anion exchange membrane and said cation exchange membrane for the accumulation of ions produced during discharge;
e. said electrolytic fluid is in contact with said primary current collector; and
f. said electrolytic fluid comprises;
  i. a solvent comprising carbon dioxide;
  ii. an electrolyte;
  iii. a polar modifier, comprising a material capable of increasing the solubility of said electrolyte in said carbon dioxide; and
  iv. said carbon dioxide is of temperature and pressure allowing dissolution of said polar modifier and said supporting electrolyte.

9. The electrochemical energy storage device of claim 7, further comprising:
a. an outer container;
b. pressurized carbon dioxide, filling said outer container;
c. said reaction container is located within said outer container, whereby said reaction container is immersed in said pressurized carbon dioxide;
d. said reaction container has a plurality of holes passable to said pressurized carbon dioxide;
e. said primary current collector of said primary positive electrode comprises:
  i. a carbon dioxide gas-diffusion electrode permeable to said pressurized carbon dioxide, but not permeable to said electrolytic fluid;
  ii. a reducing catalyst favorable for reduction of carbon dioxide to a desired reduction product;
  iii. an oxidizing catalyst favorable for oxidation of the desired reduction product to carbon dioxide; and
  iv. said reducing catalyst and said oxidizing catalyst are contained within said carbon dioxide gas-diffusion electrode;
f. said primary current collector separates said electrolytic fluid from the plurality of holes in said reaction container;
g. said electrolytic fluid comprises an ionic liquid, contacting said primary current collector and said negative electrode;
h. a carbon dioxide exchange membrane, sealing one portion of said reaction container;
i. an electrically insulating seal, sealing one portion of said reaction container;
j. said negative electrode comprises a conductive negative current collector;
k. said negative current collector extends through said electrically insulating seal, whereby said negative current collector extends both within and without said reaction container, but does not electrically contact said reaction container; and
l. means for electrically contacting said negative current collector and said primary current collector from the outside of said outer container.

10. The electrochemical energy storage device of claim 9, wherein:
a. said negative current collector comprises a copper rod; and
b. said negative electrode further comprises a metal that is reactive with said reduction product, which metal encases the portion of said negative current collector that is located within said reaction container.

11. The electrochemical energy storage device of claim 9, wherein:
a. said negative current collector comprises a hydrogen gas-diffusion electrode passable to hydrogen, but not passable to said electrolytic fluid; and
b. said negative electrode further comprises:
  i. hydrogen; and
  ii. means for supplying said hydrogen to said hydrogen gas-diffusion electrode, whereby said hydrogen may diffuse through said hydrogen gas-diffusion electrode into said reaction container.

12. The electrochemical energy storage device of claim 1, wherein said ionic conductors comprise:
a. a first electrolytic solution that is in contact with said primary current collector;
b. a second electrolytic solution that is essentially non-corrosive to said negative electrode, which first electrolytic solution is in contact with said negative electrode; and
c. a cation exchange membrane separating said first electrolytic solution from said second electrolytic solution.

13. The electrochemical energy storage device of claim 12, wherein said first electrolytic solution comprises:
a. a solvent comprising carbon dioxide;
b. an electrolyte;
c. a polar modifier, comprising a material capable of increasing the solubility of said electrolyte in said carbon dioxide; and
d. said carbon dioxide is of temperature and pressure allowing dissolution of said polar modifier and said supporting electrolyte.

14. The electrochemical energy storage device of claim 13, wherein said carbon dioxide is supercritical.

15. The electrochemical energy storage device of claim 12, further comprising:
a. an anion exchange membrane passable to said first electrolytic solution; and
b. said anion exchange membrane is located between said cation exchange membrane and said primary current collector, thereby creating a compartment between said anion exchange membrane and said cation exchange membrane for the accumulation of ions produced during discharge.

16. The electrochemical energy storage device of claim 15, wherein said first electrolytic solution comprises:
a. a solvent comprising carbon dioxide;
b. an electrolyte;
c. a polar modifier, comprising a material capable of increasing the solubility of said electrolyte in said carbon dioxide; and
d. said carbon dioxide is of temperature and pressure allowing dissolution of said polar modifier and said supporting electrolyte.

17. The electrochemical energy storage device of claim 16, wherein said carbon dioxide is supercritical.

18. The electrochemical energy storage device of claim 1, further comprising:
a. said primary positive electrode further comprises a reducing catalyst favorable for reducing said carbon dioxide to a desired reduction product, which reducing catalyst at least partially covers the surface of said primary current collector;

b. a charging positive electrode, ionically connected to said negative electrode and said primary positive electrode by said one or more ionic conductors; and c. said charging positive electrode comprising:
  i. means for electrochemically oxidizing the desired reduction product to carbon dioxide;
  ii. said electrochemical oxidation means comprising a conductive charging current collector, contacting one of said ionic conductors, whereby the desired reduction product is oxidized upon said charging current collector during charging;
  iii. said charging current collector comprising a material to which said carbon dioxide is essentially non-corrosive; and
  iv. an oxidizing catalyst favorable for oxidizing the desired reduction product to said carbon dioxide, which oxidizing catalyst at least partially covers the surface of said charging current collector.

19. The electrochemical energy storage device of claim 1 whereby said one or more ionic conductors comprises an organic electrolyte, an aqueous solution, or carbon dioxide.

20. The electrochemical energy storage device of claim 1 whereby said one or more ionic conductors comprises quaternary ammonium salts or phosphonium cation.

21. An electrochemical energy storage device of claim 1 wherein:
  a. said electrochemical reduction means further comprising a conductive primary current collector, contacting said carbon dioxide, whereby said carbon dioxide is reduced upon said primary current collector during the discharge cycle of said electrochemical energy storage device forming a desired reduction product; and
  b. a means for oxidizing the desired reduction product to carbon dioxide.

22. An electrochemical energy storage device of claim 1 wherein:
  a. said primary current collector further comprising:
    i. a reducing catalyst favorable for reduction of carbon dioxide to a desired reduction product; and
    ii. an oxidizing catalyst favorable for oxidation of the desired reduction product to carbon dioxide.

23. The electrochemical energy storage device of claim 1, wherein:
  a. said ionic conductors comprise an electrolyte comprising:
    i. a cation that does not reduce during the operation of the device;
    ii. an anion that is capable of reversibly oxidizing to carbon dioxide; and
    iii. said electrolyte contacts said negative electrode; and
  b. said negative electrode comprises a conductive material to which said carbon dioxide and said ionic conductors are essentially non-corrosive.

* * * * *